(12) United States Patent
Feng et al.

(10) Patent No.: US 9,891,823 B2
(45) Date of Patent: Feb. 13, 2018

(54) SYSTEM FOR SECURELY ENTERING PARTICULAR INFORMATION AND METHOD THEREOF

(71) Applicant: Neusoft Corporation, Shenyang (CN)

(72) Inventors: Xishun Feng, Shenyang (CN); Zhijian Zhang, Shenyang (CN); Jun Li, Shenyang (CN); Jun Wang, Shenyang (CN); Qingyang Meng, Shenyang (CN); Fuyang Liu, Shenyang (CN)

(73) Assignee: NEUSOFT CORPORATION, Shenyang (CN)

( * ) Notice: Subject to any disclaimer, the term of this patent is extended or adjusted under 35 U.S.C. 154(b) by 628 days.

(21) Appl. No.: 14/527,755

(22) Filed: Oct. 29, 2014

(65) Prior Publication Data

US 2016/0088471 A1    Mar. 24, 2016

(30) Foreign Application Priority Data

Sep. 19, 2014    (CN) .......................... 2014 1 0484072

(51) Int. Cl.
*G06F 3/0488* (2013.01)
*H04L 9/32* (2006.01)
*H04L 9/08* (2006.01)

(52) U.S. Cl.
CPC ........ *G06F 3/04886* (2013.01); *H04L 9/0866* (2013.01); *H04L 9/3226* (2013.01); *G06Q 2220/00* (2013.01); *H04L 9/088* (2013.01)

(58) Field of Classification Search
CPC ...... G06F 3/04886; G06F 21/31; G06F 21/71; G06F 21/72; G06F 21/82
See application file for complete search history.

(56) References Cited

U.S. PATENT DOCUMENTS

| 7,096,357 B1 | 8/2006 | Tochikubo et al. |
| 8,176,324 B1 * | 5/2012 | Krishnamurthy ..... G06F 3/0236 380/45 |

(Continued)

FOREIGN PATENT DOCUMENTS

| CN | 101340282 A | 1/2009 |
| CN | 102742250 A | 10/2012 |

(Continued)

OTHER PUBLICATIONS

Xiyou Wang, "Secure Isolation Based on ARM TrustZone Research and Application", a Master Thesis submitted to University of Electronic Science and Technology of China, 21 pages, published on Jan. 15, 2014.

(Continued)

*Primary Examiner* — Khang Do
(74) *Attorney, Agent, or Firm* — Kilpatrick Townsend & Stockton LLP

(57) ABSTRACT

A system for securely entering particular information includes a mobile device and a background server. The mobile device includes a first area which is a non-secure environment, a second area which is a secure environment and a switching module implementing switchings between the first and second areas. At least one first application module for executing a business function application is provided in the first area. A second application module for executing a particular information entering application and an encryption module for encrypting entered particular information are provided in the second area. If a particular information entering is required by the first application module, the switching module triggers the second application module to perform the particular information entering, and returns, to the first application module, an encryption result obtained by encrypting the entered particular infor- (Continued)

mation. The background server includes an authentication module for authenticating the encryption result.

7 Claims, 7 Drawing Sheets

(56) References Cited

U.S. PATENT DOCUMENTS

| | | | |
|---|---|---|---|
| 2007/0098149 A1* | 5/2007 | Coenen | G06F 21/123 |
| | | | 380/2 |
| 2011/0173452 A1 | 7/2011 | Nan et al. | |
| 2011/0191591 A1* | 8/2011 | Cheng | G06F 21/36 |
| | | | 713/182 |
| 2011/0321139 A1* | 12/2011 | Jayaraman | G06F 21/51 |
| | | | 726/4 |
| 2012/0036363 A1 | 2/2012 | Langham et al. | |
| 2013/0145475 A1* | 6/2013 | Ryu | G06F 21/31 |
| | | | 726/26 |
| 2013/0339739 A1 | 12/2013 | Hueber et al. | |
| 2014/0098141 A1* | 4/2014 | Sen | G06F 3/04886 |
| | | | 345/660 |
| 2014/0201807 A1* | 7/2014 | White | G06F 21/53 |
| | | | 726/1 |
| 2014/0250404 A1* | 9/2014 | Puppin | G06F 21/36 |
| | | | 715/773 |
| 2015/0088733 A1* | 3/2015 | Monastyrsky | G06Q 20/382 |
| | | | 705/39 |

FOREIGN PATENT DOCUMENTS

| | | |
|---|---|---|
| CN | 103067158 A | 4/2013 |
| CN | 103714459 A | 4/2014 |
| JP | 2000261427 A | 9/2000 |
| JP | 2003122640 A | 4/2003 |
| JP | 2010165329 A | 7/2010 |

OTHER PUBLICATIONS

David P. Jablon with Integrity Sciences, Inc., "Extended Password Key Exchange Protocols Immune to Dictionary Attack", Proceedings of the Sixth Workshops on Enabling Technologies: Infrastructure for Collaborative Engineering (WETICE '97 Enterprise Security), IEEE Computer Society, Cambridge, MA, Jun. 18, 1997, pp. 248-255.

Jonathan Katz et al., "Round-Optimal Password-Based Authenticated Key Exchange", University of Maryland (USA) and Microsoft Research, 18 pages.

The first Office Action dated Mar. 1, 2016 regarding a Japanese counterpart application.

* cited by examiner

SYSTEM FOR SECURELY ENTERING PARTICULAR INFORMATION AND METHOD THEREOF

CROSS REFERENCES OF RELATED APPLICATION

The present application claims the priority to Chinese Patent Application No. 201410484072.8, entitled "SYSTEM FOR SECURELY ENTERING PARTICULAR INFORMATION AND METHOD THEREOF", filed on Sep. 19, 2014 with the State Intellectual Property Office of the People's Republic of China, which is incorporated herein by reference in its entirety.

FIELD

The disclosure relates to information security technology, and particularly, to a system for securely entering particular information and a method thereof.

BACKGROUND

As smart mobile device being widely used, more and more businesses such as a financial transfer business and an Office Automatic (OA) service of an enterprise, which are processed originally in a PC environment, may be processed in the smart mobile device. In processing these businesses, a user is generally required to enter related particular information (such as a bank account password, an enterprise account password or a credit card number) on the mobile device, to authenticate a user identity or confirm transaction security. However, since an operating system of the mobile device is designed based on a concept of openness and practicability, a consideration for the security is not sufficient; hence, the particular information entered by the user on the smart device may be stolen by a criminal, which results in information leakage and huge potential security hazard.

To solve such security problem of the mobile device, there is a conventional solution of customizing a virtual keyboard, that is, in an application, particular information is entered by a custom virtual keyboard rather than by a keyboard provided by the operating system of the mobile device. Reference may be made to FIG. 1, where FIG. 1A shows a structure of a customized virtual keyboard, and FIG. 1B shows a process flow of entering particular information by using the customized virtual keyboard. A particular information entering application 1100 is for requesting a user to enter particular information. A particular information entering region 1110 is for receiving the particular information such as sensitive particular information entered by the user. A customized virtual keyboard 1120 takes the place of a systematic default keyboard and is for realizing security entering. When the particular information entering region 1110 becomes an entering focus, the built-in virtual keyboard 1120 is activated by the particular information entering application 1100 (as shown by label 1 in FIG. 1B); the systematic default keyboard is shielded by the built-in virtual keyboard 1120 (as shown by label 1.1 in FIG. 1B), and the customized virtual keyboard is displayed; the particular information entered by the user is then received by the virtual keyboard (as shown by label 1.2 in FIG. 1B); the particular information entered by the user is encrypted by the virtual keyboard 1120 by using a built-in key (as shown by labels 1.3 and 1.3.1 in FIG. 1B), and a ciphertext is returned to the particular information entering application 1100; after receiving the encrypted particular information, the particular information entering application 1100 submits the encrypted particular information to a background service (as shown by label 2 in FIG. 1B) to perform an authentication (as shown by label 2.1 in FIG. 1B); and then an authentication result is returned by the background service.

Since when the user enters the particular information, the keyboard built in the operating system is shielded by the application, and the information is entered by using the custom virtual keyboard, which prevents the particular information from being stolen by malicious software to some extent. However, the customized virtual keyboard still is run in an environment of the operating system of the mobile device, and a running environment is still a non-security execution environment; although the systematic keyboard is shielded, touch information generated when entering the particular information through the virtual keyboard and a content displayed by a screen may be intercepted by the malicious software, to further obtain the particular information entered by the user.

SUMMARY

To solve the problems described above, a system for securely entering particular information and a method thereof are provided according to embodiments of the disclosure, to enhance or improve security of entering the particular information on a mobile device.

A system for securely entering particular information according to an embodiment of the disclosure includes a mobile device and a background server, where the mobile device includes a first area, a second area and a switching module for implementing switchings between the first area and the second area; the first area is a non-security execution environment, and at least one first application module for executing a business function application is provided in the first area; the second area is a secure execution environment, a second application module for executing a particular information entering application and a encryption module for encrypting entered particular information are provided in the second area, and the particular information entering application is associated with the business function application; the switching module is for triggering, in a case that a particular information entering is required by the first application module, the second application module to perform the particular information entering, and returning, to the first application module, an encryption result obtained by encrypting the entered particular information by the encryption module; and the background server includes an authentication module for authenticating the encryption result from the first application module.

Preferably, a first storage device is further provided in the second area, the first storage device is for storing a key corresponding to the business function application, and the encryption module may be for encrypting the entered particular information by using the key stored in the first storage device.

Preferably, a second storage device is further provided on the second area, the second storage device is for storing a key; the background server may further include a key certificate module for storing a key certificate index, the background server may be connected to the second area through a key certificate transmission channel, the key certificate module may transmit the key certificate index to the encryption module through the key certificate transmission channel before the entered particular information is encrypted by the encryption module; and the encryption module is for obtaining a corresponding key based on the key certificate index and encrypting the entered particular information by using the obtained key.

Preferably, the background server further includes a key seed generating module for generating key seed information, the key seed information is for generating a key for encrypting the entered particular information, a key seed acquiring module for acquiring the key seed information from the background server is provided in the first area; the switching module is for, in a case that the particular information entering is required by the first application module, triggering the second application module, through the key seed information, to perform the particular information entering; and the encryption module is for encrypting the entered particular information by using a key generated from the key seed information.

Further preferably, the key seed generating module of the background server includes a first request receiving submodule, an inquiry submodule and a first key seed generating submodule, where the first request receiving submodule is for receiving a request message requesting for a key seed sent by the key seed acquiring module of the mobile device, the request message includes a unique identifier of a user of the business function application; the inquiry submodule is for inquiring, based on the unique identifier of the user, to acquire first particular information corresponding to the user; and the first key seed generating submodule is for, generating the key seed information by using a one-way function based on the unique identifier of the user and the first particular information and returning the key seed information to the key seed acquiring module, where the key seed information is first key seed information.

Further preferably, the key seed generating module further includes a first random number generating submodule for generating a first random number; and the first key seed generating submodule is for generating the first key seed information by using the one-way function based on the unique identifier of the user, the first particular information and the first random number.

Preferably, the encryption module includes a second request receiving submodule, a second key seed generating submodule, a first key generating submodule and an encryption submodule, where the second request receiving submodule is for receiving the unique identifier of the user and first key seed information from the first area, the second key seed generating submodule is for generating second key seed information by using a one-way function based on the unique identifier of the user and second particular information entered by the user; the first key generating submodule is for generating a first key by using a blending function based on the first key seed information and the second key seed information; and the encryption submodule is for encrypting the second key seed information by using the first key, to form a ciphertext; and the authentication module includes a second key generating submodule, a decryption submodule and an authentication submodule, the second key generating submodule is for generating a second key by using a blending function based on the first key seed information and the second key seed information; the decryption submodule is for decrypting the ciphertext by using the second key; and the authentication submodule is for determining whether a decryption result is same as the second key seed information, where an authentication is passed in a case that the decryption result is same as the second key seed information.

Further preferably, the encryption module further includes a second random number generating module for generating a second random number; the second key seed generating submodule is for generating the second key seed information by using a one-way function based on the unique identifier of the user, the second particular information entered by the user and the second random number.

A method for securely entering particular information is further provided according to an embodiment of the disclosure, and the method includes:

triggering, in a case that a particular information entering is required by a business function application, a particular information entering application associated with the business function application to get into a state of entering particular information, where an environment in which the business function application is run is a non-secure execution environment of a mobile device, and an environment in which the particular information entering application is run is a secure execution environment of the mobile device;

receiving particular information entered by a user through the particular information entering application in the secure execution environment; and encrypting the entered particular information in the secure execution environment, and returning an encryption result to the business function application run in the non-secure execution environment.

Preferably, the encrypting the entered particular information in the secure execution environment includes:

acquiring a key corresponding to the business function application in the secure execution environment; and encrypting the entered particular information in the secure execution environment by using the key.

Preferably, the encrypting the entered particular information in the secure execution environment includes:

acquiring, through a key certificate transmission channel, a key certificate index from a background server connected to the mobile device, obtaining a corresponding key in the secure execution environment by using the key certificate index, and encrypting the entered particular information by using the key.

Preferably, the method further includes:

sending, by the business function application in non-secure execution environment, a request message for acquiring key seed information to the background server connected to the mobile device, to receive first key seed information, where the request message includes a unique identifier of a user, the first key seed information is generated by the background server by using a one-way function based on the unique identifier of the user and first particular information, and the first particular information is obtained through an inquiry performed by the background server based on the unique identifier of the user; and acquiring the unique identifier of the user and the first key seed information in the secure execution environment;

where the encrypting the entered particular information in the secure execution environment includes:

generating second key seed information by using a one-way function based on the unique identifier of the user and entered second particular information in the secure execution environment, generating a first key by using a blending function based on the first key seed information and the second key seed information, and encrypting the second key seed information by using the first key, to form a ciphertext as an encryption result.

Preferably, a first random number is generated by the background server, and the first key seed information is generated by the background server by using a one-way function based on the unique identifier of the user, the first random number and the first particular information; and a second random number is randomly generated in the secure execution environment, and the generating the second key seed information by using the one-way function based on the unique identifier of the user and the entered second particular information in the secure execution environment includes: generating the second key seed information by using a one-way function based on the unique identifier of the user, the entered second particular information and the second random number in the secure execution environment.

In the embodiments of the disclosure, the mobile device is divided into at least two areas, one area is a secure execution environment, and another area is a non-secure execution environment. A general operation (process) for realizing the business function is performed in the non-secure execution environment, and a process in which it is required to enter sensitive particular information is performed in the secure execution environment. In this way, processes such as entering, receiving, storing and displaying the particular information, in which information may be stolen, may be performed in the secure execution environment. The particular information has been encrypted when being delivered to the first application module, the particular information may not be stolen by malicious software no matter in a step of acquiring the particular information or in a subsequent step; therefore, the security is enhanced or improved in a process of entering the particular information.

BRIEF DESCRIPTION OF THE DRAWINGS

With a detailed description in conjunction with drawings, the above and other objectives, features and advantages of exemplary embodiments of the disclosure may be easily understood. In the drawings, several embodiments of the disclosure are illustrated in an exemplary and nonrestrictive way.

DETAILED DESCRIPTION OF THE EMBODIMENTS

The principle and spirit of the disclosure are described below with reference to several exemplary embodiments. It should be understood that, the embodiments provided are only intended to enable those skilled in the art to understand and further realize the disclosure, rather than to limit the scope of the disclosure in any form. The embodiments are provided to make the disclosure clearer and more complete, and to completely convey the scope of the disclosure to those skilled in the art.

A First Embodiment

Figure 1A:
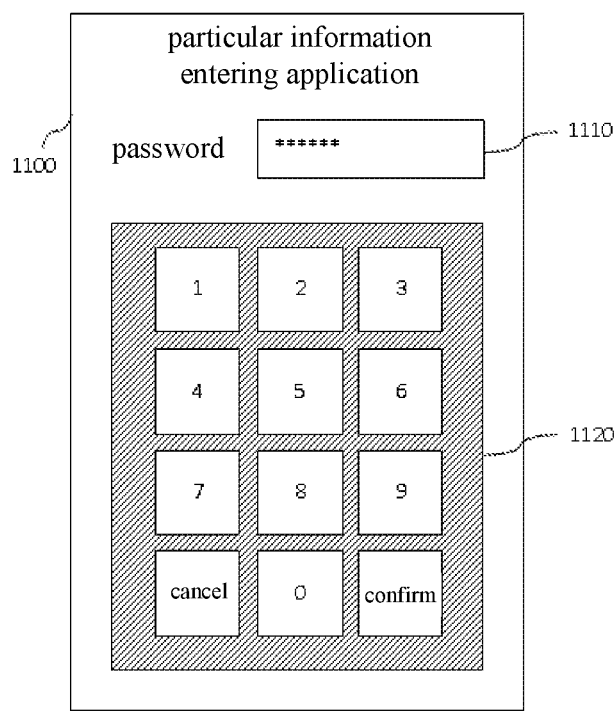
FIG. 1A is a schematic structural diagram of a conventional customized virtual keyboard.
Figure 1B:
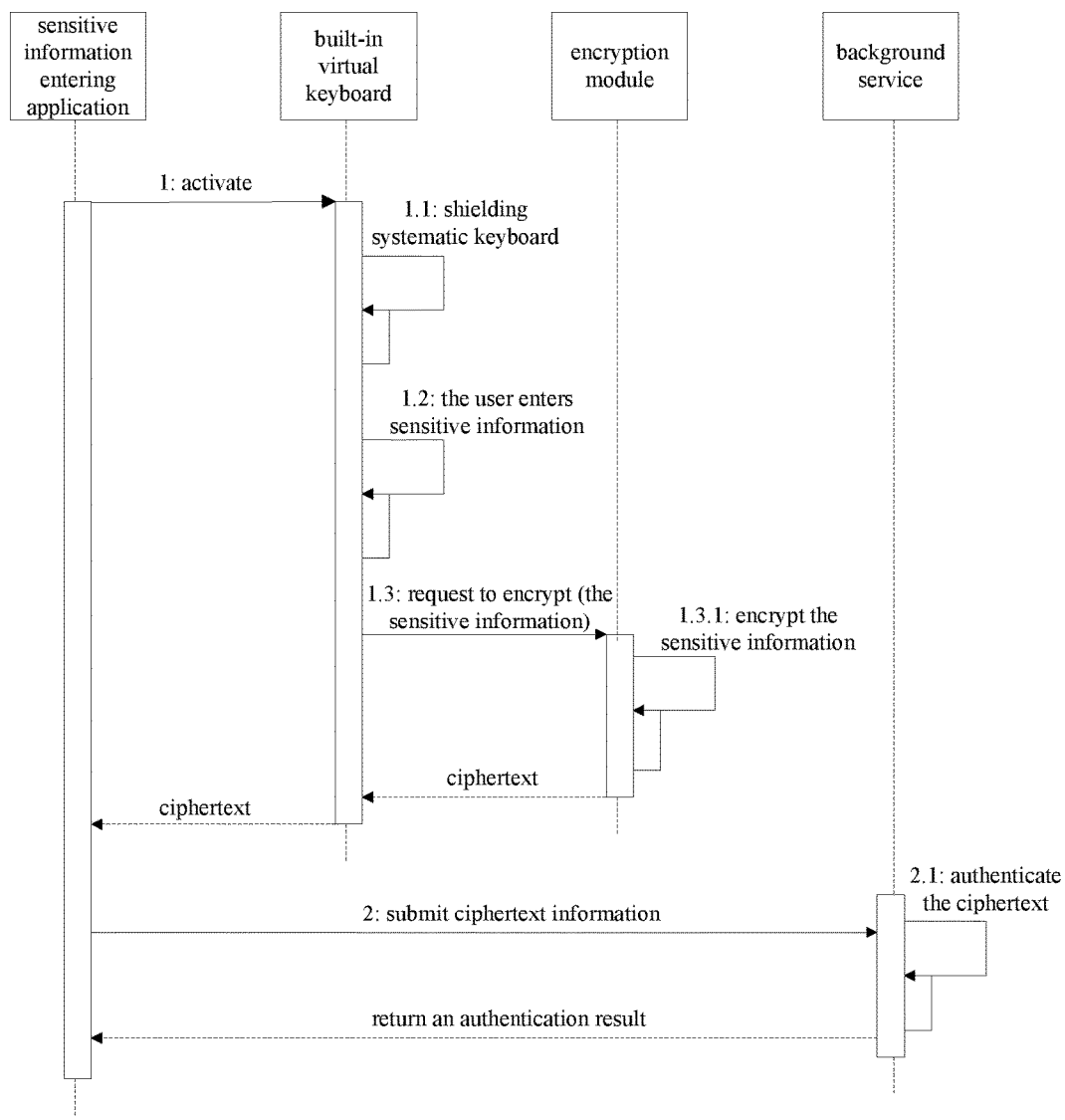
FIG. 1B is a flow chart of a conventional process of entering particular information.
Figure 2:
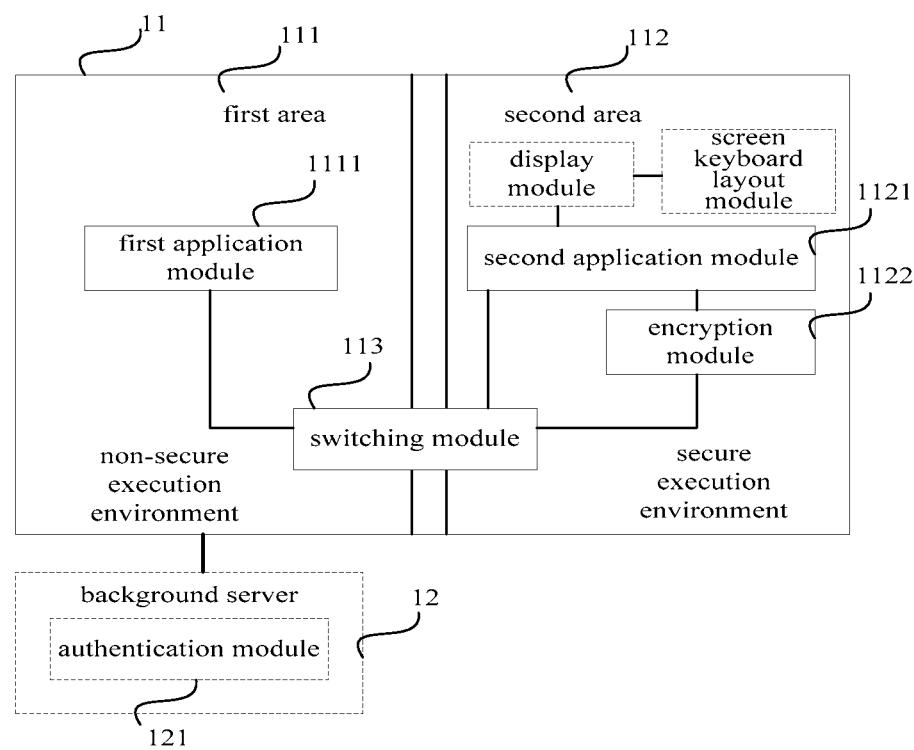
FIG. 2 is a structural diagram of a system for securely entering particular information according to an embodiment of the disclosure.

A reference is made to FIG. 2 which shows a structure of a system for securely entering particular information according to the first embodiment of the disclosure. In the embodiment, the system for securely entering particular information includes a mobile device 11 and a background server 12.

The mobile device 11 includes a first area 111 and a second area 112. As shown in FIG. 2, the two areas 111 and 112 are separated, and a switching module 113 is used to achieve switchings between the first area and the second area. In an actual application, the two areas may be realized by virtualizing one application processor into two processors, and the two areas are separated by a firewall.

In the embodiment, the two areas have different properties. The first area 111 is a non-secure execution environment, and a first application module 1111 for executing a business function application is provided in the first area. The second area 112 is a secure execution environment, and a second application module 1121 for executing a particular information entering application is provided in the second area. There is an association relationship between applications respectively run by the first application module in the first area 111 and the second application module 1121 in the second area 112, and the association relationship may be represented in multiple forms. For example, an application run by the second application module is necessary for a business function to be realized by the first application module, and the business function may be realized well through a combined function of the application run by the first application module and the application run by the second application module. Practically, a business function may be realized through only the first application module in the first area in some cases, and a cooperation of the second application module in the second area is only required to realize a specific business function. That is, the first application module is independent from the second application module in some cases, while the second application module should normally cooperate with the first application module. The cooperation may be reflected as follows: in a case that a particular information entering is required by the first application module during realizing the business function, a control is handed over to the second area by the switching module 113 to trigger a running of the application on the second application module. It should further be illustrated here that, the business function application and the particular information entering application may be two independent applications; or may be sub-applications formed by one application respectively in the secure execution environment and in the non-secure execution environment based on a "two-area" architecture, where the sub-applications work cooperatively.

For example, a mobile banking application (APP) normally has multiple functions such as a history inquiring, a card-to-card transfer, and information statistics. In a case that it is required to realize a business function such as the history inquiring or the information statistics, it is merely required to run an APP in a non-secure execution environment of a mobile phone. However, in a case that the card-to-card transfer is to be performed, a user is required to enter a transfer amount; here to ensure entering security, it is required to trigger a running of a transfer amount entering application in a secure execution environment, to run the APP in the non-secure execution environment. The transfer amount is entered through the transfer amount entering application, and is then fed back to the mobile banking APP.

Based on the "two-area" architecture, in the embodiment, an encryption module 1122 for encrypting the entered particular information is further provided in the second area, to guarantee that the application of the second application module securely returns acquired particular information to the first application module, and particularly, to guarantee a security when the particular information gets into the first area from the second area through the firewall and when the particular information is transmitted within the first area. A key for encrypting may be prestored in a storage device of the second area, and the key corresponds to the business function application. In a process of encrypting, first, the key corresponding to the business function application is acquired in the secure execution environment; and then, the particular information entered in the secure execution environment is encrypted by using the key. In this way, although the particular information needs to pass the first area which is the non-secure execution environment, to be returned to the first application module, since the particular information is encrypted in the second area which is the secure execution environment, the particular information may be guaranteed to reach the first application module securely without being stolen, thereby achieving a related business function. Obviously, delivering the particular information from the second area to the first area is based on the switching module 113 functioning as a "bridge", that is, the switching module 113 is further for returning, to the first application module, an encryption result obtained by encrypting the entered particular information by the encryption module.

The background server 12 includes an authentication module 121 for authenticating the encryption result from the first application module. It should be illustrated that the background server may be not necessary in terms of solving the technical problem; nevertheless, the security of the system for entering particular information may be further guaranteed by the authentication module of the background server.

Figure 3:
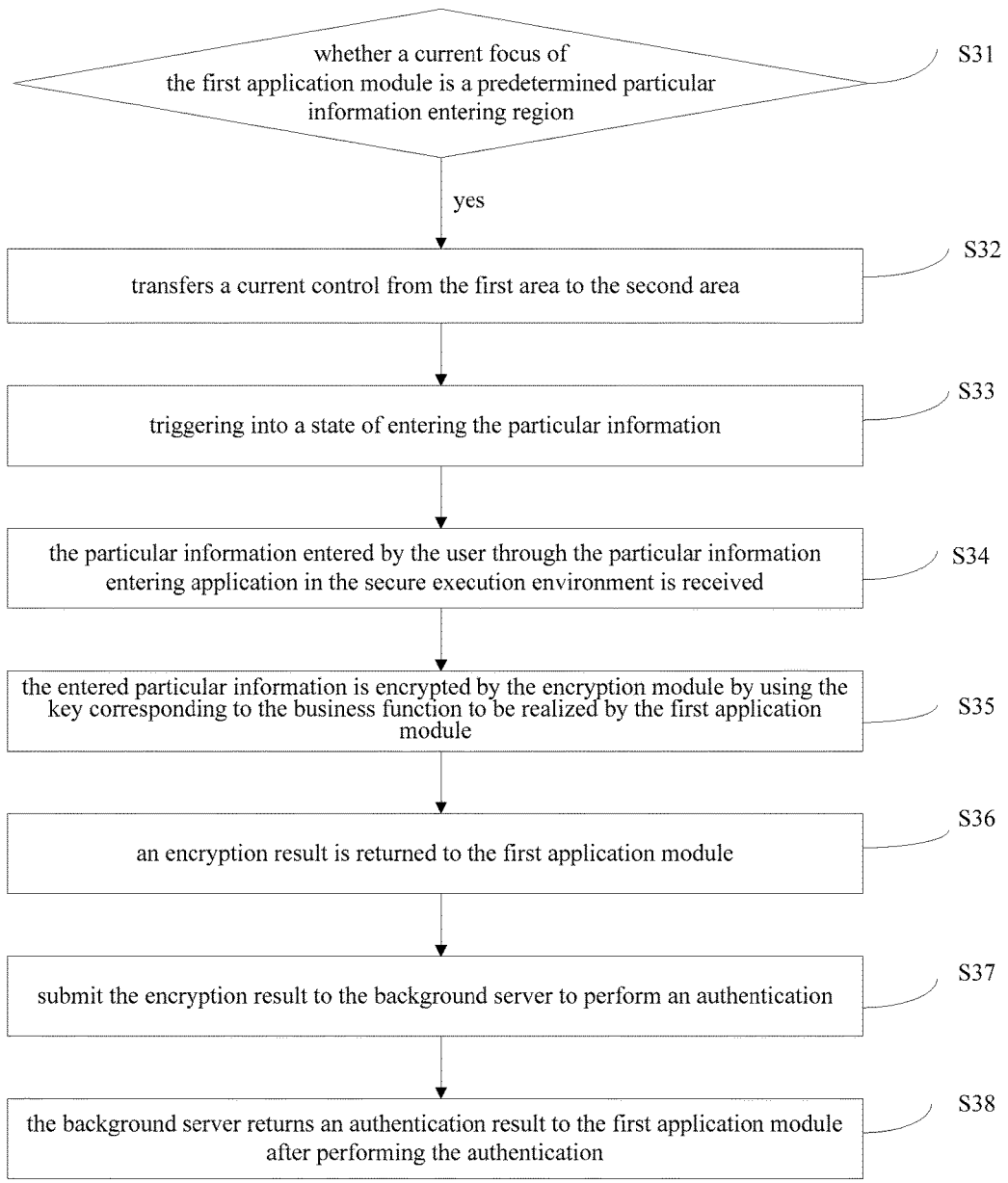
FIG. 3 is a flow chart of realizing a business function by using the system as shown in FIG. 2.

A process of realizing the business function according to the embodiment may be referred to FIG. 3 which shows an operation procedure according to the embodiment. In running the business function application installed in the first area of the mobile device, in a case that a current focus of the first application module is a predetermined particular information entering region (for example, an operator holding the mobile device performs a click operation in the particular information entering region and the particular information entering region may be set as the current focus), it is indicated that the business function application requires an entering of the particular information (a step S31); here, the first application module may trigger the switching module and the switching module transfers a current control from the first area to the second area (a step S32), i.e., from the non-secure execution environment to the secure execution environment, and the second application module located in the second area is triggered into a state of entering the particular information (a step S33); after the particular information entered by the user through the particular information entering application in the secure execution environment is received (a step S34), the particular information is submitted to the encryption module in the second area, and the entered particular information is encrypted by the encryption module by using the key corresponding to the business function to be realized by the first application module (a step S35); an encryption result is then returned to the first application module by the switching module (a step S36); after receiving encrypted particular information, the first application module may submit the encrypted particular information to the background server to perform an authentication (a step S37); the background server returns an authentication result to the first application module after performing the authentication (a step S38), and the first application module may perform a subsequent operation of the business function.

In the embodiment, the mobile device is divided into at least two areas, one area is a secure execution environment, and another area is a non-secure execution environment. A general operation (process) for realizing the business function is performed in the non-secure execution environment, and a process in which it is required to enter sensitive particular information is performed in the secure execution environment. In this way, processes such as entering, receiving, storing and displaying the particular information, in which information may be stolen, may be performed in the secure execution environment. The particular information has been encrypted when being delivered to the first application module, the particular information may not be stolen by malicious software no matter in a step of acquiring the particular information or in a subsequent step; therefore, the security is enhanced or improved in a process of entering the particular information. Detailed advantages of the embodiment of the disclosure are given as follows.

(1) In the process of entering the particular information, the second application module according to the embodiment is run in the secure execution environment; same as the conventional customized virtual keyboard technology, a content of the particular information may not be directly stolen by the malicious software in a step of entering the particular information.

(2) In the conventional customized virtual keyboard technology, although it may be guaranteed, by shielding the systematic default keyboard, that the content of the particular information may not be acquired directly by the malicious software, since a whole application is run in a single execution environment which is not designed securely, the malicious software may intercept the particular information through the particular information displayed on the screen and touch information generated when the particular information is entered by the user. In the embodiment, however, processes of displaying and storing the particular information after the particular information is entered are also performed in the secure execution environment; therefore, the particular information may not be stolen by the malicious software.

(3) In the conventional customized virtual keyboard technology, the particular information may be stored in a memory of the system after being entered by the user through the customized virtual keyboard; although the operating system of the mobile device may provides some degree of security mechanism for storing the particular information, the malicious software may evade the security mechanism and then acquire the particular information entered by the user. In the embodiment, since the process of storing the particular information is performed in the secure execution environment, a leakage risk may not exist.

(4) In the conventional customized virtual keyboard technology, if the particular information is encrypted, since the key for encrypting is stored in a same environment as the virtual keyboard, the malicious software may obtain a ciphertext and an encryption key, and the particular information entered by the user may be acquired through an approach such as the dictionary attack or the Brute force. In the embodiment, however, the process of encrypting is performed in the secure execution environment, and the particular information has been encrypted before being delivered to the first application module; hence, the ciphertext and the encryption key may not be acquired by the malicious software, and accordingly, the particular information may not obtained through cracking.

A Second Embodiment

In the aforementioned embodiment, the technical solution of the disclosure for solving various defects in the conventional virtual keyboard technology is introduced in detail. In the solution of the aforementioned embodiment, to encrypt the entered particular information, the encryption module in the second area needs to acquire, from the storage device, the key corresponding to the business function of the first application module, and then the particular information is encrypted by using the key. That is, in a case that in the first area there are multiple first application modules for realizing different business functions, it is required to prestore keys corresponding to respective applications in the storage device in the second area, to guarantee the security during entering the particular information in the second area; hence, an application developer needs to simultaneously develop two modules (the first application module and the second application module) which run in different execution environments and cooperate with each other. Actually, providers of secure operating systems in execution environments for different chips may be different, and development models for secure applications run on the secure operating systems are also different, the application developer needs to develop by taking multiple versions into consideration, which results in significant increases in development cycle and development cost.

Figure 4:
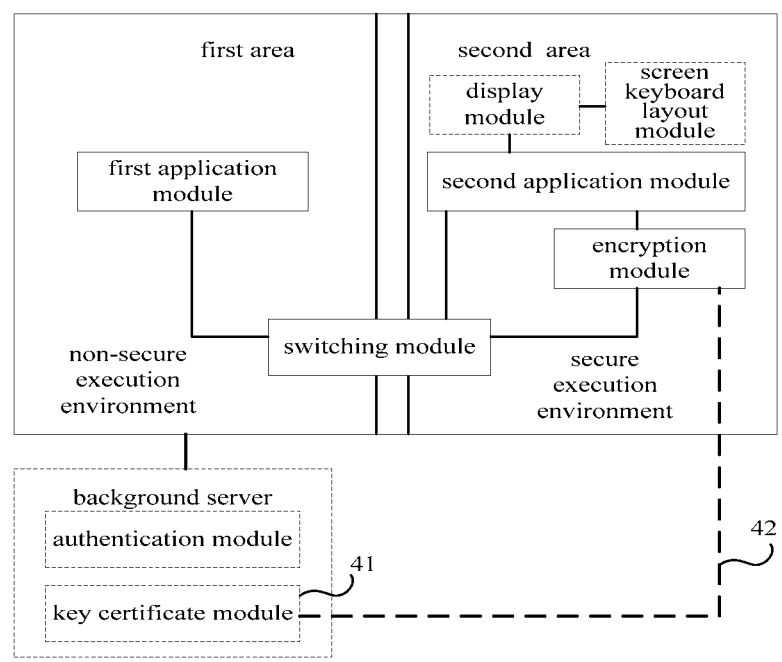
FIG. 4 is a structural diagram of a system for securely entering particular information according to an embodiment of the disclosure.

In the embodiment of the disclosure, preferably, a particular information application is generalized in the second area to weaken a coupling between an application in the first area and an application in the second area. FIG. 4 shows a structure of a system according to the second embodiment, and the above objective is realized with the system. In the system according to the embodiment, the background server further includes a key certificate module 41 for storing a key certificate index, a storage device for storing a key is provided in the second area, and the background server is connected to the second area through a key certificate transmission channel 42. In a case that the encryption module is required to encrypt entered particular information, the key certificate index is transmitted to the encryption module by the key certificate module 41 through the key certificate transmission channel 42; the encryption module first acquires the key certificate index from the background server through the key certificate transmission channel, then acquires a corresponding key in the secure execution environment by using the key certificate index, and encrypts the entered particular information by using the acquired key.

In the embodiment, since the key, with which the encryption module in the second area performs the encryption, is designated by the background server and is then conveyed to the encryption module through a particular transmission channel; hence, a tight coupling between the application run on the first application module and the application run on the second application module is weakened in some degree. That is, the second application module in the second area is generalized in this way; even in a case that an encryption is required, it is unnecessary to separately develop second applications respectively corresponding to different first applications, since the generalized second application module may satisfy different first application modules.

In the technical solution of the embodiment, other technical effects may further be obtained. For example, in the solution of the first embodiment, it is required to separately deploy the module corresponding to the application for realizing the business function and the module corresponding to the particular information entering application associated with the business function application (that is the first application module and the second application module); and to guarantee the security of the secure execution environment, the mobile device may normally strictly check and sign a program deployed and run in the secure execution environment and the qualification of the developer, thereby lengthening the development cycle of the application and increasing the cost of the application. In the embodiment, however, the key, with which the encryption module in the second area performs the encryption, is designated by the background server, and the key certificate is given through the transmission channel between the background server and the second area; therefore, it is not required to perform a qualification examination on the second application module deployed in the second area, and it is not required to develop a corresponding checking program or signature program, and accordingly, the development cycle is shortened and the cost is decreased. In addition, for example, after the operation environment of the mobile device is divided into areas, in the first embodiment, a secure application (the particular information entering application run on the second application module) is correspondingly developed for each non-secure application (the business function application run on the first application module), the limited resource of the second area as the secure execution environment may be depleted quickly (especially in a case that there are many non-secure applications), which may bring a greater deployment problem to the application developer. In the embodiment, however, since the particular information entering application run by the second application module in the second area is generalized, it is not required to develop secure applications corresponding to different non-secure applications run in the non-secure environment; hence, a problem caused by deployment of multiple independent secure applications is avoided, and the limited resource in the second area is saved effectively.

A Third Embodiment

Figure 5:
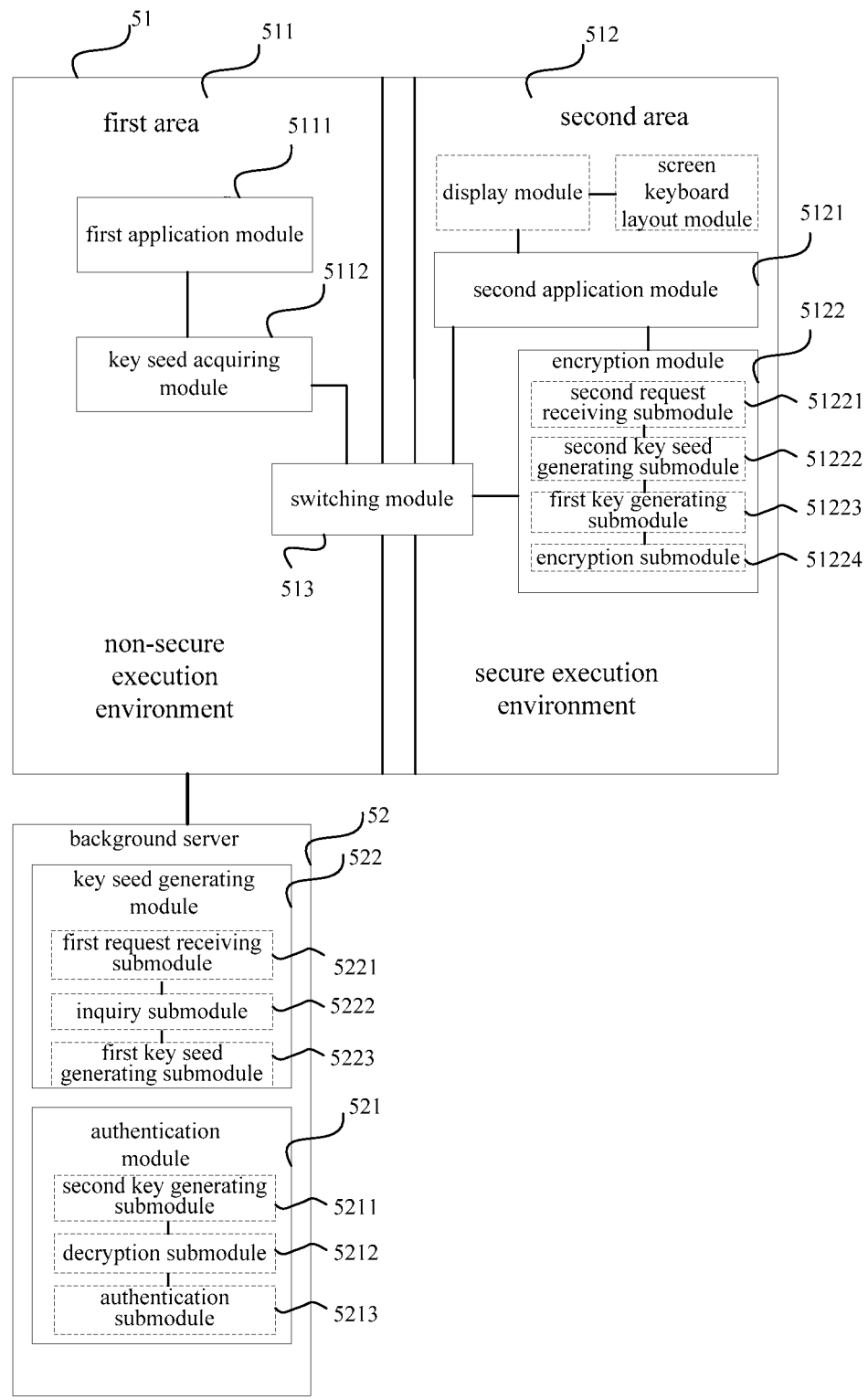
FIG. 5 is a structural diagram of a system for securely entering particular information according to an embodiment of the disclosure.

As described above, difficulties in developing and deploying the secure application are solved with the technical solution according to the second embodiment. Actually, since the particular information entering application run by the second application module according to the above embodiment is generalized, the particular information entering application may serve for different non-secure applications in the non-secure execution environment; hence, different keys need to be selected, which may result in the difficulty in key deployment. Normally, the key deployment is performed by using a public key system, and is represented in two ways. In one way, a developer of each non-secure application gives a public key to a developer of the particular information entering application to perform an assignment; in another way, the developer of each non-secure application gives the public key to a credible third party to perform an assignment, and then an assignment result is provided to the particular information entering application to use. No matter in which way the key deployment is performed, since keys are controlled by respective organizations strictly, it is required to perform complex business cooperation negotiations to give the keys to other party to perform the assignments, which results in increases of the development cost and the deployment cost. Also, in a case that the non-secure application (the business function application run by the first application module) located in the first area requests the secure application (the particular information entering application) in the second area to provide a particular information entering service, it is required to designate a certificate or an index for encrypting the particular information, while a process of designating the key is performed in the non-secure execution environment; therefore, the security risk exists, malicious software may tamper the designated key and may replace the designated key with a key of the malicious software or other keys having potential security hazards, and accordingly, the malicious software may attack a ciphertext when the ciphertext is returned, to obtain the particular information entered by the user. In view of above, a system for securely entering particular information is provided according to the third embodiment of the disclosure. FIG. 5 shows a structure of the system for securely entering particular information. The system according to the embodiment includes a mobile device 51 and a background server 52.

The mobile device 51 includes a first area 511, a second area 512, and a switching module 513 for implementing switchings between the first area and the second area. As described above, the two areas of the mobile device have different properties. The first area 511 is a non-secure execution environment, and a first application module 5111 for running a business function application is provided in the first area. The business function application run by the first application module is a non-secure application. Multiple non-secure applications may be deployed based on actual needs, the deployed multiple non-secure applications may be run in one application module, or may be respectively run in separate application modules. The second area 512 is a secure execution environment, a second application module 5121 for running a particular information entering application in the business function application is provided in the second area, and the particular information entering application run by the second application module is a secure application. Furthermore, a key seed acquiring module 5112 is provided in the first area, to acquire key seed information from the background server; and an encryption module 5122 for encrypting entered particular information is provided in the second area; specifically, a key generated from the key seed information is used to encrypt the particular information. The switching module 513 is for, triggering the second application module to perform particular information entering through the key seed information in a case that the particular information entering is required by the first application module, and returning, to the first application module, an encryption result obtained by encrypting the entered particular information by the encryption module.

The background server 52 may include an authentication module 521 for authenticating the encryption result from the first application module. Furthermore, the background server 52 includes a key seed generating module 522 for generating the key seed information, and the key seed information is for generating the key for encrypting the entered particular information.

Figure 6:
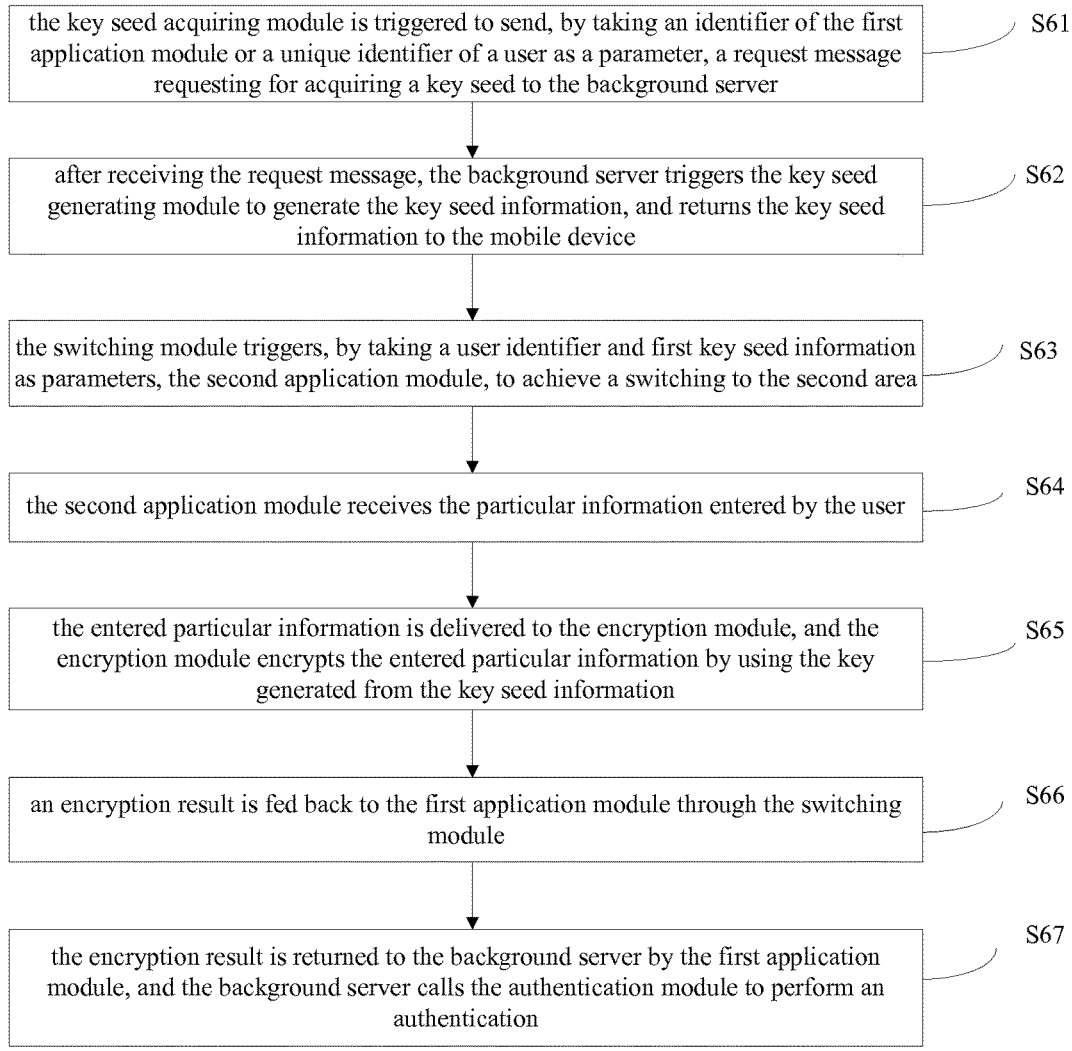
FIG. 6 is a flow chart of realizing a business function by using the system as shown in FIG. 5.

FIG. 6 shows procedures of information interactions between various modules of the system according to the embodiment. After the first application module, which is located in the first area (the non-secure execution environment), for running the business function application is initiated, the key seed acquiring module is triggered to send, by taking an identifier (number) of the first application module or a unique identifier of a user as a parameter, a request message requesting for acquiring a key seed to the background server (a step S61). The identifier (number) here is used to distinguish, in a case that there are multiple non-secure applications on the mobile device, which application on the mobile device sends the request message. The identifier (number) may be represented as an identifier of the first application module, or may be represented as an identifier of a user operating the business function application on the first application module, as long as different request messages may be distinguished. After receiving the request message, the background server triggers the key seed generating module to generate the key seed information, and returns the key seed information to the mobile device (a step S62). After receiving the information returned from the background server, the mobile device delivers the received information to the switching module; and the switching module triggers, by taking a user identifier and first key seed information as parameters, the second application module, to achieve a switching from the first area to the second area which is the secure execution environment (a step S63). The second application module receives the particular information entered by the user (a step S64). Then, the entered particular information is delivered to the encryption module, and the encryption module encrypts the entered particular information by using the key generated from the key seed information (a step S65). Subsequently, an encryption result is fed back to the first application module through the switching module (a step S66). The encryption result is returned to the background server by the first application module, and the background server calls the authentication module to perform an authentication (a step S67).

In the embodiment, various modules may have different internal structures based on different ways for realizing the functions of the various modules. For example, in an actual application, the key seed generating module 522 may include a first request receiving submodule 5221, an inquiry submodule 5222 and a first key seed generating submodule 5223.

The first request receiving submodule 5221 is for receiving a key seed request message sent by the mobile device, where the request message includes a unique identifier of a user. The inquiry submodule 5222 is for inquiring first particular information corresponding to the user based on the unique identifier of the user. The first key seed generating submodule 5223 is for, generating first key seed information by using a one-way function based on the unique identifier of the user and the first particular information, and returning the first key seed information to the key seed acquiring module. With this structure, after a request for acquiring the key seed information is received by the first request receiving submodule, the request being sent by the business function application in the non-secure execution environment to the background server connected to the mobile device, the inquiry submodule inquires the first particular information corresponding to the user based on the unique identifier of the user, and then, the first key seed generating submodule generates the first key seed information by using the one-way function based on the unique identifier of the user and the first particular information, and returns the first key seed information to the key seed acquiring module.

In addition, for example, the encryption module 5122 may include a second request receiving submodule 51221, a second key seed generating submodule 51222, a first key generating submodule 51223 and an encryption submodule 51224.

The second request receiving submodule 51221 is for receiving the unique identifier of the user and the first key seed information from the first area; the second key seed generating submodule 51222 is for generating second key seed information by using a one-way function based on the unique identifier of the user and second particular information entered by the user; the first key generating submodule 51223 is for generating a first key by using a blending function based on the first key seed information and the second key seed information; and the encryption submodule 51224 is for encrypting the second key seed information by using the first key, to form a ciphertext.

Corresponding to the above structure of the encryption module, the authentication module 521 may include a second key generating submodule 5211, a decryption submodule 5212 and an authentication submodule 5213. The second key generating submodule 5211 is for generating a second key by using a blending function based on the first key seed information and the second key seed information; the decryption submodule 5121 is for decrypting the ciphertext by using the second key; and the authentication submodule 5213 is for determining whether a decryption result is same as the first key seed information, where an authentication is passed in a case that the decryption result is same as the first key seed information.

Based on the internal structures of the different modules described above, a unique method for encrypting and authenticating the particular information may be formed. The second request receiving submodule of the encryption module receives the unique identifier of the user and first key seed information KS1, delivered from the first area; and then the second key seed generating submodule generates the second key seed information KS2 by using the one-way function FS based on the unique identifier ID1 of the user and the second particular information X2 entered by the user; the first key generating submodule generates the first key K1 by using the blending function FC based on the first key seed information KS1 and the second key seed information KS2; and the encryption submodule encrypts the second key seed information KS2 by using the first key K1, to form the ciphertext CT1. The ciphertext CT1 and the second key seed information KS2 are returned to the first application module through the switching module, and are delivered to the background server by the first application module.

The authentication module in the background server performs the authentication by using the ciphertext CT1 and the second key seed information KS2. The second key generating submodule of the authentication module generates the second key K2 by using the blending function FC based on the first key seed information KS1 and the second key seed information KS2; the decryption submodule decrypts the ciphertext CT1 by using the second key K2, to obtain the second key seed information KS2; and the authentication submodule determines whether the KS2 obtained through decryption is same as first key seed information KS1, where the authentication is passed in a case that the KS2 is same as the first key seed information KS1.

It may be known from the system and the method according to the embodiment that it is not required to deploy the key in the embodiment, the encryption and the transmission of the particular information may be realized by using only existing information, which overcomes a prejudice that the key for encrypting the particular information must be deployed in advance in order to guarantee the security.

In the embodiment, the one-way function and the blending function may be represented in various ways, and any mathematical functions conforming to the cryptography security standard may serve as the one-way function and the blending function. Two exemplary implementations are given here. An extension in terms of the cryptography may be performed by those skilled in the art based on the two exemplary implementations. The extension may include, for example, salting, adding a counter, adding the number of communication or zero-knowledge proof, changing a way in which the particular information is stored on the background server, or achieving with any other one-way function and blending function having similar functions; in a word, those variation or extension ways should fall within the scope of protection of the disclosure.

In one exemplary implementation, the one-way function FS and the blending function FC are obtained by making an improvement based on a SPEKE key exchange algorithm. The one-way function FS and the blending function FC may be respectively represented by the following mathematic expressions:

$$FS=((H(X,ID)^2) \bmod p)^R \bmod p,$$

where H( ) is a summary function which may be represented as a hash function such as SHA256; X is particular information, and the particular information may be X1 (particular information prestored by the background server) or X2 (particular information entered by the user); ID is the unique identifier of the user, and in a case that there are multiple non-secure applications on the mobile device, ID may include ID1 (an identifier corresponding to a current non-secure application) or ID2 (a current identifier received by a secure application); p is a random secure prime number; and R is a random number; and $$FC=KS^R \bmod p,$$

where KS represents the key seed information which may be KS1 and KS2, and R is a random number which may be R1 and R2.

In another exemplary implementation, the one-way function FS and the blending function FC are obtained by making an improvement based on a J-PAKE key exchange algorithm. The one-way function FS and the blending function FC may be respectively represented by the following mathematic expressions:

$$FS1=g^{(o1+o3+o4+IDq)\cdot o2 \cdot X} \text{ (for a background server 400)}$$

$$FS2=g^{(o1+o2+o3+IDq)\cdot o4 \cdot X} \text{ (for a sensitive information security entering application 310),}$$

where IDq is a unique identifier of the user, which is mapped to a 1-q space; g and q are respectively a generator and a prime order of a group G of prime order (or a Schnorr group) hold by both the background server and a secure particular information entering application; o1 and o2 are random numbers randomly selected from a range from 1 to q by the background server; o3 and o4 are random numbers randomly selected from the range from 1 to q by the particular information security entering application; FS1 is used mainly by the background server, and FS2 is used mainly by the particular information entering application run on the second application module; and $$FC1=(KS2/g^{(o2 \cdot o4 \cdot X)})^{o2}$$

$$FC2=(KS1/g^{(o2 \cdot o4 \cdot X)})^{o4},$$

where KS1 and KS2 are key seeds respectively calculated by the background server and the secure particular information entering application; FC1 is used mainly by the background server, and FC2 is used mainly by the particular information entering application run on the second application module.

A Fourth Embodiment

The embodiments described above may be improved based on some common needs, to obtain better technical effects. For example, in the various embodiments described above, a screen keyboard layout module may further be provided in the second area which is the secure execution environment, to control a layout of a screen keyboard. In this way, characters on the virtual keyboard or a layout of the virtual keyboard may be generated randomly or based on a certain rule every time the particular information is entered, thereby weakening an association between different times of particular information enterings and enhancing security level.

In addition, for example, a display module may be added in the second area which is the secure application execution environment, to display images of the screen keyboard and an entering region visible for the user, and background images of the entering region and the screen keyboard may employ a screenshot of the non-secure application.

The technical solution of the third embodiment may be improved in many aspects. For example, the particular information entering application may take the place of the business function application to request, by taking the unique identifier of the user as a parameter, the key seed generating module of the background server to generate the key seed information. Furthermore, to enhance the user experience, the non-secure application for realizing the business function may request, through one request, the user to enter multiple pieces of particular information; or may request, through one request, the user to enter multiple pieces of information, a part of the multiple pieces of information is sensitive information hold by the background server and the user in common. In a case that multiple pieces of sensitive information are entered at a time, the multiple pieces of sensitive information may be spliced to serve as the parameter X2 of the one-way function. In a case that the entered information includes both sensitive information and non-sensitive information, the sensitive information may be spliced as the parameter X2 of the one-way function, and the remaining non-sensitive information serves as a part of a plaintext obtained through an encryption by using the key K1.

It should be noted that the preferred embodiments described above are not regarded as limitations to the disclosure, the scope of protection of the disclosure should be consist with the scope defined in the claims. Various improvements and polish may be made by those skilled in the art without departing from the spirit and scope of the disclosure, and these improvements and polish should all fall within the scope of protection of the disclosure.

The invention claimed is:

1. A system for securely entering particular information, comprising:
a mobile device and a background server,
wherein the mobile device comprises a processor, and the processor is configured to implement switching between a non-secure execution environment and a secure execution environment;
wherein the processor is virtualized into a first processor and a second processor, the first processor is configured to execute a business function application in the non-secure execution environment, and the second processor is configured to execute a particular information entering application and encrypt entered particular information in the secure execution environment;
wherein the particular information entering application is associated with the business function application; and
wherein implementing the switching between the non-secure execution environment and the secure execution environment comprises: triggering, in a case that a particular information entering is required by the business function application executed by the first processor, the second processor to perform the particular information entering, and returning, to the first processor, an encryption result obtained by encrypting the entered particular information by the second processor;
wherein the background server is configured to authenticate the encryption result from the first processor;
wherein the background server is further configured to generate key seed information, the key seed information is for generating a key for encrypting the entered particular information, and the first processor is further configured to acquire, in the non-secure execution environment, the key seed information from the background server; and
wherein implementing the switching between the non-secure execution environment and the secure execution environment comprises: in response to the particular information entering being required by the business function application executed by the first processor, triggering the second processor through the key seed information, to perform the particular information entering, and wherein encrypting the entered particular information in the secure execution environment comprises encrypting the entered particular information by using the key generated from the key seed information.

2. The system according to claim 1, wherein generating the key seed information comprises:
receiving a request message requesting for a key seed, wherein the request message is sent by the first processor of the mobile device and comprises a unique identifier of a user of the business function application; inquiring, based on the unique identifier of the user, to acquire first particular information corresponding to the user; and generating the key seed information by using a one-way function based on the unique identifier of the user and the first particular information and returning the key seed information to the first processor, wherein the key seed information is first key seed information.

3. The system according to claim 2, wherein the generating the key seed information further comprises generating a first random number; and the generating the key seed information by using a one-way function based on the unique identifier of the user and the first particular information comprises: generating the first key seed information by using a one-way function based on the unique identifier of the user, the first particular information and the first random number.

4. The system according to claim 1, wherein
the encrypting the entered particular information by using the key generated from the key seed information comprises receiving a unique identifier of a user and first key seed information from the non-secure execution environment, generating second key seed information by using a one-way function based on the unique identifier of the user and second particular information entered by the user; generating a first key by using a blending function based on the first key seed information and the second key seed information; encrypting the second key seed information by using the first key, to form a ciphertext; and wherein authenticating the encryption result from the first processor comprises generating a second key by using a blending function based on the first key seed information and the second key seed information; decrypting the ciphertext by using the second key; and determining whether a decryption result is same as the second key seed information, wherein an authentication is passed in a case that the decryption result is same as the second key seed information.

5. The system according to claim 4, wherein the encrypting the entered particular information by using the key generated from the key seed information further comprises generating a second random number; and the generating second key seed information by using a one-way function based on the unique identifier of the user and second particular information entered by the user comprises generating the second key seed information by using a one-way function based on the unique identifier of the user, the second particular information entered by the user and the second random number.

6. A method for securely entering particular information, comprising:

triggering, in a case that a particular information entering is required by a business function application, a particular information entering application associated with the business function application to get into a state of entering particular information, wherein an environment in which the business function application is run is a non-secure execution environment of a mobile device, and an environment in which the particular information entering application is run is a secure execution environment of the mobile device;

receiving particular information entered by a user through the particular information entering application in the secure execution environment; and encrypting the entered particular information in the secure execution environment, and returning an encryption result to the business function application run in the non-secure execution environment;

wherein the business function application in the non-secure execution environment sends a request message for acquiring key seed information to a background server connected to the mobile device, to receive first key seed information, wherein the request message comprises a unique identifier of a user, the first key seed information is generated by the background server by using a one-way function based on the unique identifier of the user and first particular information, and the first particular information is obtained through an inquiry performed by the background server based on the unique identifier of the user;

wherein the unique identifier of the user and the first key seed information are acquired in the secure execution environment; and wherein the encrypting the entered particular information in the secure execution environment comprises:

generating second key seed information by using a one-way function based on the unique identifier of the user and entered second particular information in the secure execution environment, generating a first key by using a blending function based on the first key seed information and the second key seed information, and encrypting the second key seed information by using the first key, to form a ciphertext as an encryption result.

7. The method according to claim 6, wherein a first random number is generated by the background server, and the first key seed information is generated by the background server by using a one-way function based on the unique identifier of the user, the first random number and the first particular information; and a second random number is randomly generated in the secure execution environment, and the generating the second key seed information by using the one-way function based on the unique identifier of the user and the entered second particular information in the secure execution environment comprises: generating the second key seed information by using a one-way function based on the unique identifier of the user, the entered second particular information and the second random number in the secure execution environment.

* * * * *